US010412183B2

(12) United States Patent
Gibson et al.

(10) Patent No.: US 10,412,183 B2
(45) Date of Patent: *Sep. 10, 2019

(54) METHODS AND SYSTEMS FOR PERSONALIZING CONTENT IN ACCORDANCE WITH DIVERGENCES IN A USER'S LISTENING HISTORY

(71) Applicant: Spotify AB, Stockholm (SE)

(72) Inventors: Clay Gibson, New York, NY (US);
Will Shapiro, New York, NY (US);
Santiago Gil, Portland, OR (US); Ian Anderson, New York, NY (US);
Margreth Mpossi, Stamford, CT (US);
Oguz Semerci, New York, NY (US);
Scott Wolf, New York, NY (US)

(73) Assignee: Spotify AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/684,841

(22) Filed: Aug. 23, 2017

(65) Prior Publication Data

US 2018/0248965 A1 Aug. 30, 2018

Related U.S. Application Data

(60) Provisional application No. 62/522,012, filed on Jun. 19, 2017, provisional application No. 62/463,553, filed on Feb. 24, 2017.

(51) Int. Cl.
*H04L 29/08* (2006.01)
*H04L 29/06* (2006.01)
(Continued)

(52) U.S. Cl.
CPC ............ *H04L 67/22* (2013.01); *G06F 16/435* (2019.01); *G06F 16/635* (2019.01);
(Continued)

(58) Field of Classification Search
CPC ....... H04L 67/22; H04L 67/18; H04L 67/306; H04L 65/60; H04L 67/10;
(Continued)

(56) References Cited

U.S. PATENT DOCUMENTS 8,656,043 B1 * 2/2014 Wieder ................. H04L 67/306
360/55
9,473,582 B1 * 10/2016 Fraccaroli ............. H04L 67/306
(Continued)

OTHER PUBLICATIONS

Perfecto Herrera et al., Rocking around the clock eight days a week: an exploration of temporal patterns of music listening, WOMRAD 2010 Workshop on Music Recommendation and Discovery, Sep. 26, 2010, Barcelona, Spain, 4 pgs.
(Continued)

*Primary Examiner* — Greg C Bengzon
(74) *Attorney, Agent, or Firm* — Morgan, Lewis & Bockius LLP

(57) ABSTRACT

An electronic device accesses a listening history of a user of a media-providing service, and for each characteristic of a set of characteristics describing tracks provided by the media-providing service, determines a measure of divergence with respect to listening contexts for the listening history of the user. The electronic device identifies a characteristic that has a respective measure of divergence that satisfies a threshold indicative of a lack of uniformity in the listening history with respect to the listening contexts. The electronic device determines a representative value of the identified characteristic for a listening context corresponding to a current listening context of the user. The electronic device provides personalized content to a client device of the user based on the current listening context and representative value of the identified characteristic.

18 Claims, 6 Drawing Sheets

(51) Int. Cl.
*G06F 16/435* (2019.01)
*G06F 16/635* (2019.01)

(52) U.S. Cl.
CPC .......... H04L 65/4069 (2013.01); H04L 67/18 (2013.01); *H04L 67/42* (2013.01)

(58) Field of Classification Search
CPC ........... H04L 2463/101; H04L 63/0807; G06F 17/30861; G06F 17/30772; G06F 3/04842; G06F 17/30029; G06F 21/10; G06F 17/30743; G06F 17/30749; G06F 17/30752; G06F 17/30761; G06F 3/0482; G06F 3/04847; G06F 3/165; G06F 17/3005; G06F 17/30053; G06F 17/30241; G06F 17/3053; G06F 17/30758; G06F 17/30764; G06F 17/30766; G06F 17/30769; G06F 17/30775; G06F 17/30778; G06F 17/30787; G06F 17/30828; G06F 17/30867; G06F 3/0488; G06N 5/02; G06N 5/04; G06N 99/005; G06Q 30/0277; G06Q 30/00; G06Q 10/101; G06Q 30/0631; G06Q 50/01; G06Q 10/10; G06Q 20/1235; G06Q 20/28; H04W 4/028; H04W 4/02; H04W 4/021; H04W 4/20; G10H 1/0025; G10H 2240/131; H04M 1/72558; H04M 1/72522; H04N 21/26258; H04N 21/41407; H04N 21/8113; H04N 21/8547; G11B 27/031; G11B 27/28; G11B 2020/10546; G11B 20/10527; G11B 27/00; G11B 27/105; G11B 27/22; G11B 27/3027; G11B 27/329

See application file for complete search history.

(56) References Cited

U.S. PATENT DOCUMENTS

| | | | | |
|---|---|---|---|---|
| 9,536,197 B1* | 1/2017 | Penilla | | G06N 5/025 |
| 9,645,788 B1* | 5/2017 | Wieder | | G06F 21/10 |
| 9,723,038 B2* | 8/2017 | Corbin | | H04L 65/403 |
| 9,740,982 B2* | 8/2017 | Shishido | | G06N 5/04 |
| 2002/0138630 A1* | 9/2002 | Solomon | | G06F 17/30017 709/228 |
| 2003/0014407 A1* | 1/2003 | Blatter | | G06F 16/40 |
| 2003/0037036 A1* | 2/2003 | Weare | | G06F 17/30598 |
| 2005/0249080 A1* | 11/2005 | Foote | | G06F 17/30743 369/59.1 |
| 2007/0074617 A1* | 4/2007 | Vergo | | G06F 17/30743 84/612 |
| 2007/0074618 A1* | 4/2007 | Vergo | | G10H 1/00 84/612 |
| 2007/0074619 A1* | 4/2007 | Vergo | | G10H 1/42 84/612 |
| 2008/0091717 A1* | 4/2008 | Garbow | | G06F 16/635 |
| 2008/0208775 A1* | 8/2008 | Vossen | | G11B 27/031 706/12 |
| 2008/0257134 A1* | 10/2008 | Oppenheimer | | G10H 1/0058 84/609 |
| 2008/0288354 A1* | 11/2008 | Flinn | | G06N 99/005 705/14.53 |
| 2008/0300702 A1* | 12/2008 | Gomez | | G10L 25/48 700/94 |
| 2009/0049045 A1* | 2/2009 | Askey | | G06F 17/30761 |
| 2009/0056525 A1* | 3/2009 | Oppenhimber | | G06F 17/30743 84/609 |
| 2009/0182736 A1* | 7/2009 | Ghatak | | G06Q 30/02 |
| 2011/0004642 A1* | 1/2011 | Schnitzer | | G06F 17/30743 700/94 |
| 2011/0047471 A1* | 2/2011 | Lord | | G06Q 10/10 715/739 |
| 2011/0238779 A1* | 9/2011 | Little | | G06Q 30/02 709/217 |
| 2012/0002515 A1* | 1/2012 | Muench | | H04N 21/41422 369/30.03 |
| 2012/0023403 A1* | 1/2012 | Herberger | | G06F 17/30743 715/716 |
| 2012/0166583 A1* | 6/2012 | Koonce | | G06F 17/30861 709/217 |
| 2012/0237041 A1* | 9/2012 | Pohle | | G10L 25/48 381/56 |
| 2013/0031162 A1* | 1/2013 | Willis | | H04L 65/1069 709/203 |
| 2013/0046766 A1* | 2/2013 | Shishido | | G06F 17/30752 707/741 |
| 2013/0204813 A1* | 8/2013 | Master | | G06N 5/04 706/12 |
| 2013/0205223 A1* | 8/2013 | Gilbert | | G06Q 30/0269 715/748 |
| 2014/0018947 A1* | 1/2014 | Ales | | G11B 20/10 700/94 |
| 2014/0115461 A1* | 4/2014 | Reznor | | G06Q 30/0631 715/716 |
| 2014/0115462 A1* | 4/2014 | Reznor | | H04M 1/72522 715/716 |
| 2014/0123165 A1* | 5/2014 | Mukherjee | | H04N 21/44222 725/14 |
| 2014/0180762 A1* | 6/2014 | Gilbert | | G06Q 30/02 705/7.29 |
| 2014/0195026 A1* | 7/2014 | Wieder | | H04L 67/306 700/94 |
| 2014/0195919 A1* | 7/2014 | Wieder | | H04L 67/306 715/730 |
| 2014/0229828 A1* | 8/2014 | Bilinski | | G06F 17/30772 715/716 |
| 2014/0307878 A1* | 10/2014 | Osborne | | G06F 17/30743 381/56 |
| 2014/0334644 A1* | 11/2014 | Selig | | H03G 5/165 381/108 |
| 2015/0058903 A1 | 2/2015 | Iyengar et al. | | |
| 2015/0128039 A1* | 5/2015 | Wieder | | G06F 3/0481 715/716 |
| 2015/0256613 A1* | 9/2015 | Walker | | G06F 16/639 709/217 |
| 2015/0331940 A1* | 11/2015 | Manning | | G06F 17/30743 707/740 |
| 2015/0356087 A1* | 12/2015 | Alvino | | G06F 17/3053 707/728 |
| 2015/0356447 A1* | 12/2015 | Lowe | | G06N 5/046 706/47 |
| 2016/0088032 A1* | 3/2016 | Corbin | | H04L 65/403 715/716 |
| 2016/0092559 A1* | 3/2016 | Lind | | G06F 16/639 715/716 |
| 2016/0104486 A1* | 4/2016 | Penilla | | H04L 67/12 704/232 |
| 2016/0124629 A1* | 5/2016 | Zambrano Perozo | | G06F 3/04847 715/716 |
| 2016/0232131 A1* | 8/2016 | Liu | | G06F 17/211 |
| 2016/0239876 A1* | 8/2016 | Ales | | G10H 1/0025 |
| 2016/0292272 A1* | 10/2016 | O'Driscoll | | G06F 17/30115 |
| 2016/0342598 A1* | 11/2016 | Jehan | | G06F 17/30764 |
| 2016/0357512 A1 | 12/2016 | Reimann et al. | | |
| 2016/0357863 A1* | 12/2016 | Albalat | | G06F 17/3053 |
| 2016/0357864 A1* | 12/2016 | Venkataraman | | G06F 17/30772 |
| 2016/0371373 A1* | 12/2016 | Dean | | G11B 27/00 |
| 2017/0031920 A1* | 2/2017 | Manning | | G06F 17/30867 |
| 2017/0032256 A1* | 2/2017 | Otto | | G06N 5/04 |
| 2017/0048337 A1* | 2/2017 | Fraccaroli | | H04L 67/18 |
| 2017/0097993 A1* | 4/2017 | Reznor | | G06F 17/30761 |
| 2017/0124074 A1* | 5/2017 | Cama | | G06F 17/3005 |

(56) References Cited

U.S. PATENT DOCUMENTS

| | | | |
|---|---|---|---|
| 2017/0132250 A1* | 5/2017 | Merler | G06N 99/005 |
| 2017/0139671 A1* | 5/2017 | Gilbert | G06Q 30/0269 |
| 2017/0140757 A1* | 5/2017 | Penilla | G10L 15/22 |
| 2017/0200449 A1* | 7/2017 | Penilla | G10L 15/22 |
| 2017/0206058 A1* | 7/2017 | Kuper | G06F 3/165 |

OTHER PUBLICATIONS

Spotify AB, Extended-European-Search-Report, EP18158236.2, dated Apr. 18, 2018, 8 pgs.

* cited by examiner

METHODS AND SYSTEMS FOR PERSONALIZING CONTENT IN ACCORDANCE WITH DIVERGENCES IN A USER'S LISTENING HISTORY

RELATED APPLICATIONS

This application claims priority to U.S. Provisional Application No. 62/522,012, filed Jun. 19, 2017, entitled "Methods and Systems for Personalizing Content in Accordance with Divergences in a User's Listening History," which is incorporated by reference in its entirety. This application also claims priority to U.S. Provisional Application No. 62/463,553, filed Feb. 24, 2017, entitled "Personalizing Content Streaming Based on User Behavior," which is incorporated by reference in its entirety.

TECHNICAL FIELD

The disclosed implementations relate generally to media playback, and, in particular, to personalizing media content based on variation in a user's listening history with respect to listening contexts.

BACKGROUND

Access to electronic media, such as music and video content, has expanded dramatically over time. As a departure from physical media, media content providers stream media to electronic devices across wireless networks, improving the convenience with which users can digest and experience such content.

As part of the service they provide and to assist users in discovering new content, media content providers track and process user data in an attempt to understand user preferences, and ultimately to provide relevant content personalization. Media content providers often fail to identify patterns of user interaction that account for both context and historical listening behavior, where, for example, different contexts may affect user behavior.

SUMMARY

Accordingly, there is a need for systems and methods for personalizing media content based at least in part on variation in a user's listening history with respect to listening contexts. By identifying characteristics of media items, the divergence of historical user interaction in different contexts can be determined to allow content providers to personalize content based on a user's listening history for a current listening context.

In accordance with some implementations, a method is performed at an electronic device (e.g., associated with a media content provider) having one or more processors and memory storing instructions for execution by the one or more processors. The electronic device is associated with a media-providing service. The method includes accessing a listening history of a user of the media-providing service. The method further includes, for each characteristic of a set of characteristics describing tracks provided by the media-providing service, determining a measure of divergence with respect to listening contexts for the listening history of the user, wherein each characteristic has a plurality of possible values. The method also includes identifying a characteristic, of the set of characteristics, having a respective measure of divergence that satisfies a threshold indicative of a lack of uniformity in the listening history with respect to the listening contexts and determining a representative value of the identified characteristic for a listening context corresponding to a current listening context of the user. The method further includes, in the current listening context, providing personalized content to the user based on the representative value of the identified characteristic.

In accordance with some implementations, an electronic device (e.g., a server system, a client device, etc.) includes one or more processors and memory storing one or more programs configured to be executed by the one or more processors. The one or more programs include instructions for performing the operations of the method described above. In accordance with some implementations, a non-transitory computer-readable storage medium has stored therein instructions that, when executed by an electronic device, cause the server system to perform the operations of the method described above.

Thus, systems are provided with effective methods for personalizing content for users of a content service.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings and specification.

DETAILED DESCRIPTION

Reference will now be made to implementations, examples of which are illustrated in the accompanying drawings. In the following description, numerous specific details are set forth in order to provide an understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are used only to distinguish one element from another. For example, a first characteristic could be termed a second characteristic, and, similarly, a second characteristic could be termed a first characteristic, without departing from the scope of the various described implementations. The first characteristic and the second characteristic are both characteristics, but they are not the same characteristic.

The terminology used in the description of the various implementations described herein is for the purpose of describing particular implementations only and is not intended to be limiting. As used in the description of the various described implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Figure 1:
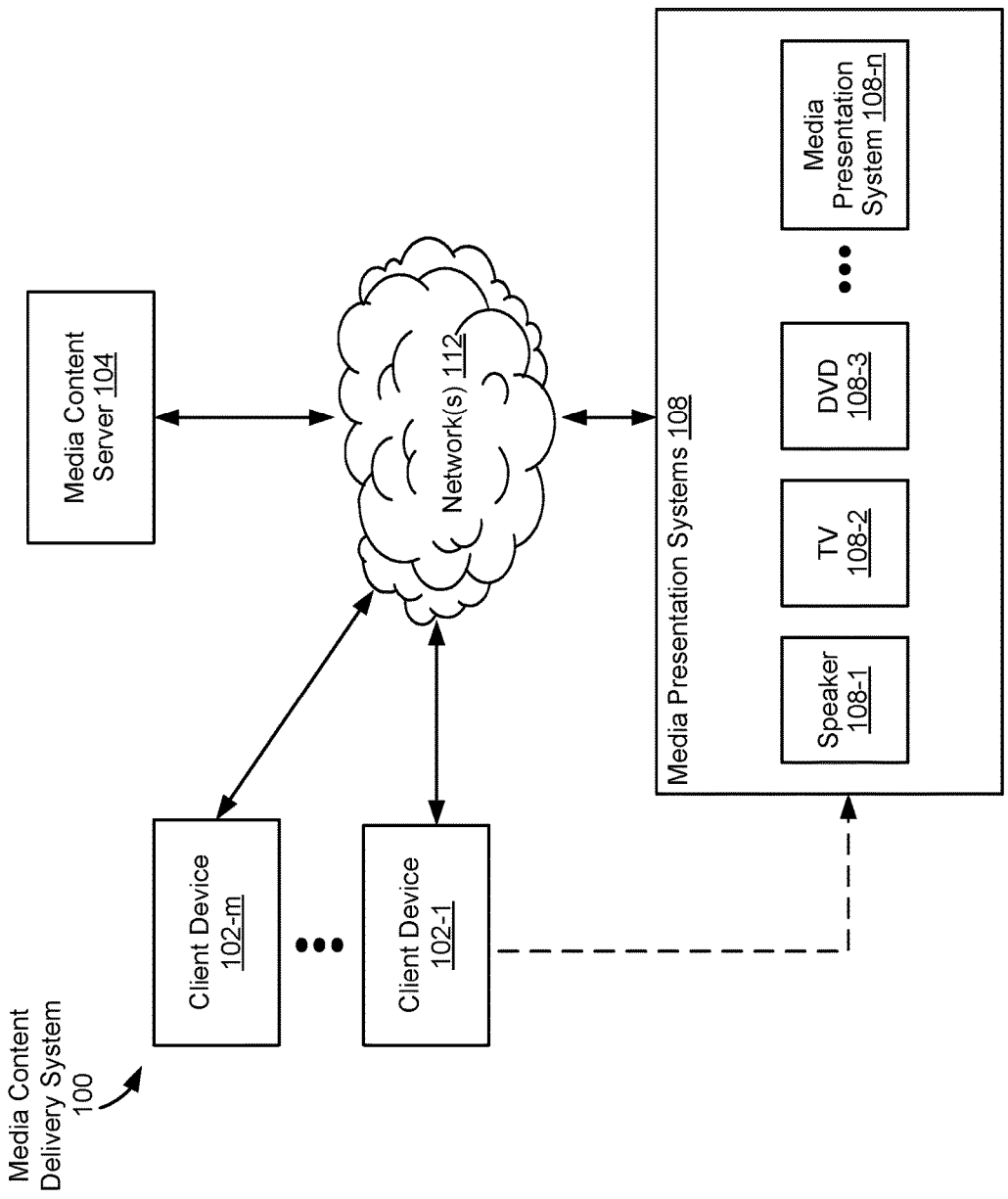
FIG. 1 is a block diagram illustrating a media content delivery system in accordance with some implementations.

FIG. 1 is a block diagram illustrating a media content delivery system 100 in accordance with some implementations. The media content delivery system 100 includes one or more client devices 102 (e.g., client device 102-1 to client device 102-m, where m is an integer greater than one), one or more media content servers 104, and one or more media presentation systems 108, including speaker 108-1, television (TV) 108-2, digital versatile disk (DVD) player 108-3, and/or other media presentation system 108-n (where n is an integer greater than three). The one or more media content servers 104 are associated with (e.g., at least partially compose) a media-providing service. One or more networks 112 communicably couple the components of the media content delivery system 100. In some implementations, the one or more networks 112 include public communication networks, private communication networks, or a combination of both public and private communication networks. For example, the one or more networks 112 can be any network (or combination of networks) such as the Internet, other wide area networks (WAN), local area networks (LAN), virtual private networks (VPN), metropolitan area networks (MAN), peer-to-peer networks, and/or ad-hoc connections.

In some implementations, a client device 102-1 or 102-m is associated with one or more users. In some implementations, a client device 102 is a personal computer, mobile electronic device, wearable computing device, laptop computer, tablet computer, mobile phone, feature phone, smart phone, digital media player, or any other electronic device capable of presenting media content (e.g., controlling playback of media items, such as music tracks, videos, etc.). A client device 102 may connect to a media presentation system 108 wirelessly or through a wired connection (e.g., directly through an interface, such as an HDMI interface). In some implementations, a client device 102 is a headless client. In some implementations, client devices 102-1 and 102-m are the same type of device (e.g., client device 102-1 and client device 102-m are both mobile devices). Alternatively, client device 102-1 and client device 102-m are different types of devices.

In some implementations, client devices 102-1 and 102-m send and receive media-control information through the networks 112. For example, client devices 102-1 and 102-m send media control requests (e.g., requests to play music, movies, videos, or other media items, or playlists thereof) to media content server 104 through network(s) 112. Additionally, client devices 102-1 and 102-m, in some implementations, also receive authentication tokens from the media content server 104 through network(s) 112.

In some implementations, client device 102-1 communicates directly with media presentation systems 108. As pictured in FIG. 1, client device 102-1 is able to communicate directly (e.g., through a wired connection or through a short-range wireless signal, such as those associated with personal-area-network (e.g., BLUETOOTH/BLE) communication technologies, radio-frequency-based near-field communication technologies, infrared communication technologies, etc.) with media presentation systems 108, while client device 102-m communicates with the media presentation systems 108 through network(s) 112. In some implementations, client device 102-1 uses the direct connection with media presentation systems 108 to stream content (e.g., data for media items) for playback on the media presentation systems 108.

In some implementations, client device 102-1 and client device 102-m each include a media application 222 (FIG. 2) that allows a user of the client device to browse, request (e.g., for playback at the client device 102 and/or a media presentation system 108), and/or present media content (e.g., control playback of music tracks, videos, etc.). Media content may be stored locally (e.g., in memory 212 of the client device 102, FIG. 2) and/or received in a data stream (e.g., from the media content server 104). The media presentation system 108 may be part of the client device 102, such as built-in speakers and/or a screen, or may be separate from the client device 102, such as a wirelessly coupled speaker (e.g., speaker 108-1).

In some implementations, the media content server 104 stores and provides media content (also referred to as media items) (e.g., media content requested by the media application 222 of client device 102-1 and/or 102-m) to client devices 102 and/or media presentation systems 108 via the network(s) 112. Content stored and served by the media content server 104, in some implementations, includes any appropriate content, including audio (e.g., music, spoken word, podcasts, etc.), videos (e.g., short-form videos, music videos, television shows, movies, clips, previews, etc.), text (e.g., articles, blog posts, emails, etc.), images (e.g., photographs, drawings, renderings, etc.), games (e.g., 2- or 3-dimensional graphics-based computer games, etc.), or any combination of content types (e.g., web pages that include any combination of the foregoing types of content or other content not explicitly listed). Audio media items (i.e., audio items) may be referred to as tracks. The description of the media content server 104 as a "server" is intended as a functional description of the devices, systems, processor cores, and/or other components that provide the functionality attributed to the media content server 104. It will be understood that the media content server 104 may be a single server computer, or may be multiple server computers. Moreover, the media content server 104 may be coupled to other servers and/or server systems, or other devices, such as other client devices, databases, content delivery networks (e.g., peer-to-peer networks), network caches, and the like. In some implementations, the media content server 104 is implemented by multiple computing devices working together to perform the actions of a server system (e.g., cloud computing).

As described above, media presentation systems 108 (e.g., speaker 108-1, TV 108-2, DVD 108-3, media presentation system 108-n) are capable of receiving media content (e.g., from the media content server 104) and presenting the received media content. For example, speaker 108-1 may be a component of a network-connected audio/video system (e.g., a home entertainment system, a radio/alarm clock with a digital display, or an infotainment system of a vehicle). In some implementations, the media content server 104 sends media content to the media presentation systems 108. For example, media presentation systems 108 include computers, dedicated media players, network-connected stereo and/or speaker systems, network-connected vehicle media systems, network-connected televisions, network-connected DVD players, and universal serial bus (USB) devices used to provide a playback device with network connectivity, and the like.

A media-providing service may examine a user's listening history to attempt to identify user habits and personalize content based on these habits.

A measure of the spread of a user's listening habits across listening contexts (e.g., across times and/or locations) is provided by the Shannon Entropy of the probability distributions representing the user's listening habits (e.g., average numbers of streams or tracks determined by listening context). The Shannon Entropy, which is zero when all streams are in a single bucket and increases as the streams become more evenly distributed, is defined as:

$$H(X) = -\sum_{i=1} P(x_i) \log_b P(x_i) \quad (1)$$

$$P(x_i) = \frac{\text{\# of streams for the } i\text{th bucket}}{\text{total \# of streams}}$$

where i may index respective values of a characteristic that describes tracks or streams, and $x_i$ represents the ith bucket for a characteristic, x. The choice of base b for the logarithm is arbitrary; in some embodiments, b=2.

However, different listening habits may result in identical Shannon Entropies. In a more involved technique, user listening behavior is partitioned in different ways (e.g., in two ways) (e.g., based on values of characteristics of tracks) and substantially different listening patterns between the partitions are identified. For example, we can record the hours a user is engaged are recorded for weekdays and weekends and the divergence between weekend and weekday listening behavior is calculated. Numerous other examples are possible. An ideal metric to quantify this divergence would be volume independent, scalable, ergodic, and stable and would apply to sparse data. A volume-independent metric should not substantially depend on whether a user predominantly listens in a particular context. Applicability to sparse data accounts for the fact that segmenting small stream counts will produce sparse data. Scalability indicates that calculation of the metric is rapid, thus allowing for use of the metric in a media-providing service with many users. An ergodic metric has an ensemble average equivalent to the time average over long time scales and large groups of users. A stable metric is able to provide an indication of consistent habits over relatively long periods of time.

In some embodiments, the generalized Jensen-Shannon Divergence (JSD) is used to identify divergence in a user's listening history. The JSD is defined as:

$$D_{JS}(p_1, p_2, \ldots, p_n) = H\left(\sum_{i=1}^{n} \pi_i p_i\right) - \left(\sum_{i=1}^{n} \pi_i H(p_i)\right) \quad (2)$$

where i indexes respective values of a characteristic that describes tracks or streams; n is the number of values of the characteristic; $p_1, p_2, \ldots, p_n$ are n probability distributions across listening contexts for the tracks; $\pi_1, \pi_2, \ldots, \pi_n$ are respective weights for respective values of the characteristic; and H(X) is the Shannon entropy. The weights may be arbitrary; in some embodiments, the weights are equal (e.g., equal 1/n) or natural weights (e.g., each distribution has a proportional weight associated with the total number of streams for a given probability distribution). The natural weight may be calculated by $$\frac{N_i}{N} = \frac{\Sigma(\text{streams in listening context } i)}{\Sigma(\text{all streams})}.$$

The divergence is calculated pairwise for context pairs (e.g., for many different contexts, multiple pairwise comparisons are computed). Because Shannon entropy is defined and non-negative for all values of $p_i$ and $\pi_i$, the Jensen-Shannon Divergence (JSD) is similarly non-negative. Furthermore, the divergence is normalized by the maximum value possible for n non-zero probability distribution functions. In some embodiments, the JSD is thus bounded to a value depending on the base of H(X): it is bounded between 0 and 1 inclusive for base 2. Given that it is well behaved with sparse data and based on simple sums and logarithms, JSD is useful to identify time-dependent or location-dependent divergence (e.g., variation) in the user's listening history.

Using JSD, users who stream more appear to also have less divergent habits This is a natural relationship of the Jensen-Shannon Divergence. A metric that provides a scalar value that is independent of the number of streams may, however, be achieved. If N is the number of streams from a user and D is the Jensen-Shannon Divergence, then $$\Delta L = \ln 2 \cdot N \cdot D \quad (3)$$

where ΔL is related to (e.g., equals or corresponds to) the increase of the log-likelihood ratio when all sequences are generated from a single probability vector (i.e. no difference in behavior across contexts). A measure of a user's divergence relative to other users in a particular context, called the Relative Adjusted Divergence (RAD), is calculated. To calculate the RAD, the expected value for ΔL is found for a given value of N. In some embodiments, the distribution follows a power law with a logarithmic term:

$$E(N) \sim A e^{b(\ln N) + c(\ln N)^2} = A N^{b + c \ln(N)} \quad (4)$$

The adjusted divergence f is independent of the number of streams and higher values correspond to more divergent behavior.

$$f = \frac{\Delta L}{E(N)} \quad (5)$$

Using this distribution, the z-score of f for each pair of listening contexts is calculated to determine the RAD:

$$\text{RAD} = \frac{f_i - \bar{f}}{\sigma_f} \quad (6)$$

RAD allows a determination of a degree to which a user's listening habits are affected by the context (e.g., for any given pair of listening contexts). If a user's listening habits vary depending on context, the value of RAD should be positive. If a user's listening habits do not vary by context, however, the value of RAD should be negative. RAD may also be calculated as a mean and/or standard deviation based on a threshold at which users are considered in the calculation.

In some embodiments, evaluation of divergence (e.g., using RAD) is only performed for users who have listened for at least a threshold amount during a preceding time period (e.g., a sliding window). For example, the evaluation is limited to users who have listened during at least six weeks of a 12-week period. This limitation eliminates users for whom signals may be too weak to detect a meaningful divergence.

Figure 2:
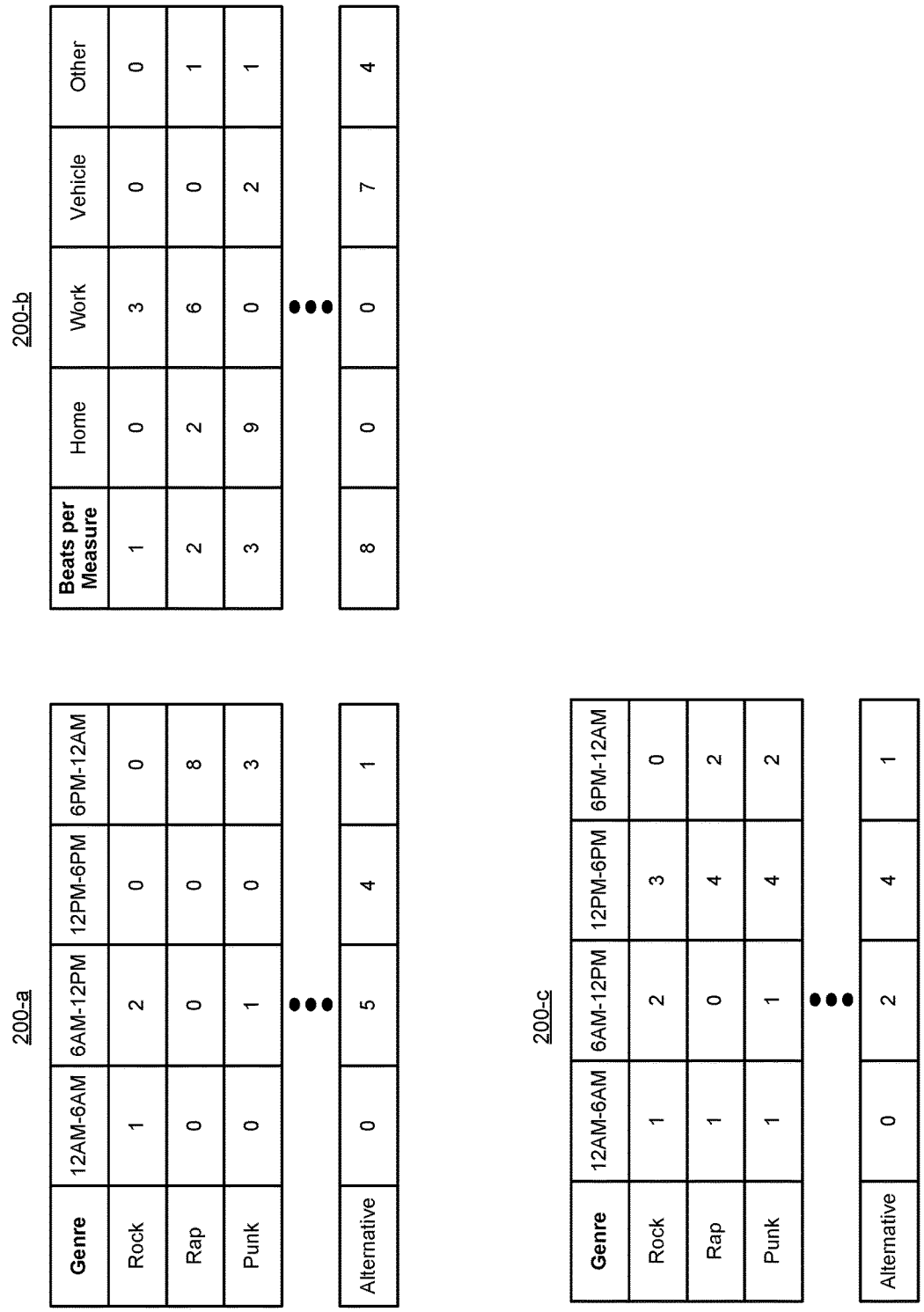
FIG. 2 is a block diagram illustrating historical listening contexts over time in accordance with some implementations.

FIG. 2 illustrates a listening history of a user for various characteristics, aggregated by listening context. As an example, the media content server 104 (FIG. 1) maintains the listening history of a user of the media-providing service, including contexts in which media requests were executed by the user. The media content server 104 collects the listening history in a plurality of listening contexts for multiple users (e.g., server system 104 stores listening history of the user in the media account database 536, FIG. 5). The tables shown in FIG. 2 may each be considered as n-dimensional matrices or the transpose of n-dimensional matrices, where n is an integer greater than or equal to 2.

In a first example of the aggregated listening history (e.g., table 200-a) of the user, the server system collects data for the user, including a characteristic that describes a track or stream (e.g., genre, examples of which include rock, rap, punk, and alternative) and the listening context in which the user requested the track or stream (e.g., time periods during a day). As shown in table 200-a, between 12 AM-6 AM, the user requested 1 rap track (e.g., a track described by a characteristic genre of rap). Between 6 AM-12 PM, the user requested 2 rock tracks, 1 punk track, and 5 alternative tracks. Between 12 PM-6 PM, the user requested 4 alternative tracks. This may indicate that the user prefers to listen to alternative tracks during the day (e.g., between 6 AM and 6 PM). Between 6 PM-12 AM, the user requested 8 rap tracks, 3 punk tracks, and 1 alternative track. This may indicate that the user prefers to listen to "rap" tracks in the evenings (e.g., between 6 PM-12 AM). A measure of divergence between values of the characteristic (e.g., between rock, rap, punk, and/or alternative genres) with respect to the various listening contexts is calculated. In this example, the different genres (and thus the rows of table 200-a) correspond to respective values of i in equation 2 and the columns of table 200-a are examples of respective probability distributions $p_i$ in equation 2. In some embodiments, the transpose (e.g., where the rows become columns and the columns become rows) of table 200-a may be used to calculate the measure of divergence. Normalizing the transpose of the table results in a mathematical equivalent of the divergence as calculated above.

The measure of divergence may indicate a degree of lack of uniformity in a user's listening history (e.g., the degree that the listening history is affected by context). For example, a user with a determined low divergence for genres has consistent habits by genre. In the example of table 200-c, the user tends to listen to tracks of various genres equally for each time period during the day. This would tend to show the user does not have a preference for genre based on the time period of the day, which may result in a low divergence.

A third example of a user's listening history is shown in table 200-b. In this example, the listening context could be a listening location (e.g., partitioned by home, work, vehicle, and other) of a client device (e.g., client device 102) of the user (e.g., as determined by location-detection device 440, FIG. 4). The characteristic is an attribute of the track that describes the number of beats per measure in the track. In some embodiments, characteristics (e.g., attributes) of a track are associated with the track at the server system (e.g., in the metadata database 534, FIG. 5). The listening history of table 200-a and 200-b may represent the listening history of the same user, or may represent different listening histories for distinct users. The listening history may be for a period of time preceding a current time. For example, the listening history may correspond to the period of the previous week, the previous month or several months, or the previous year.

In some embodiments, the characteristic describing the audio item is identified and stored for multiple listening contexts. The representation of the user's listening history could also be a three-dimensional array (or n-dimensional, where n is an integer greater than 2). This allows the listening history to account for a plurality of contexts. For example, the characteristic (e.g., rap) of the track may be compared over both periods of time of a day and the day of the week (e.g., weekend or weekday).

Figure 3A:
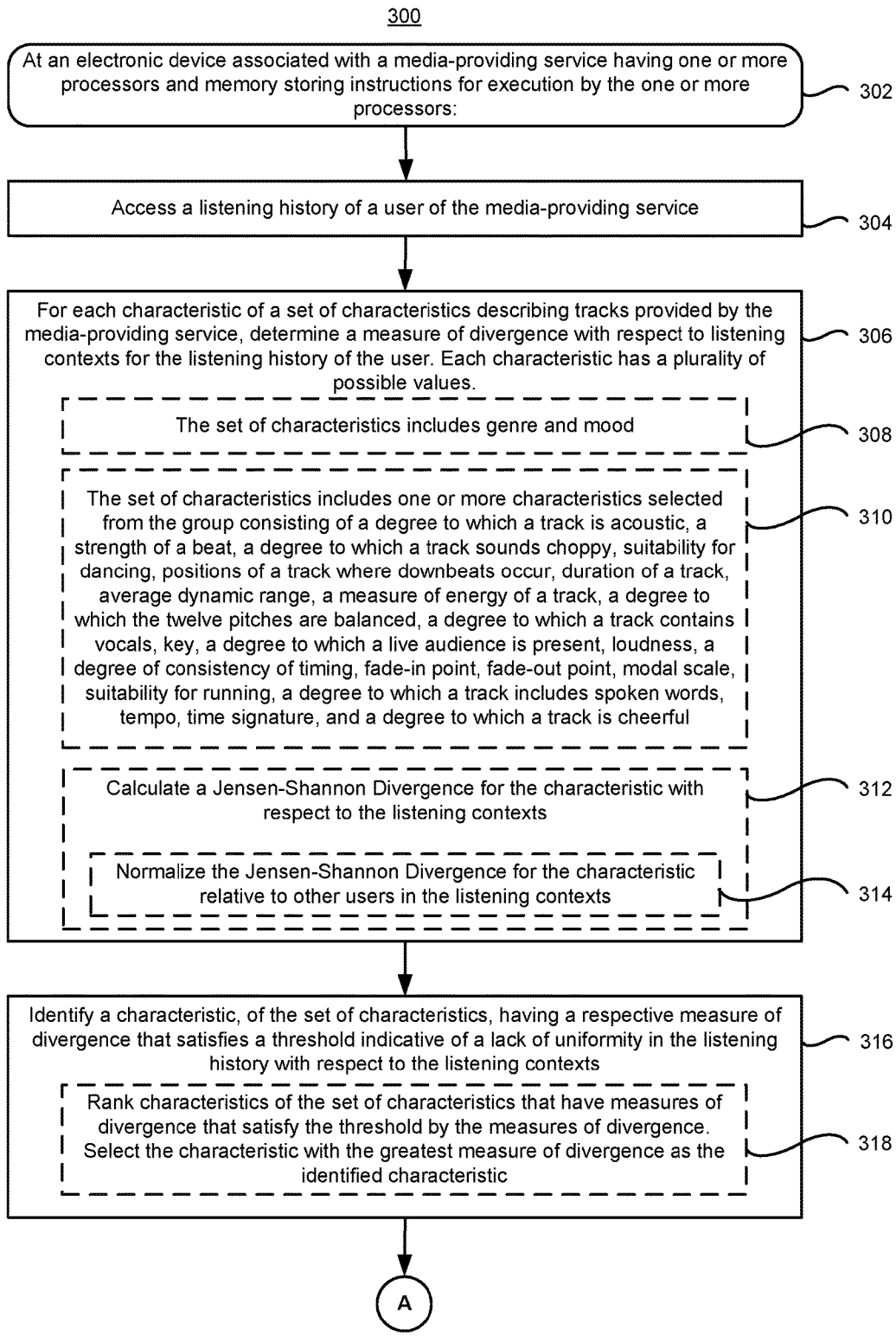
FIGS. 3A-3B are flow diagrams illustrating methods for personalizing content in accordance with some implementations.
Figure 3B:
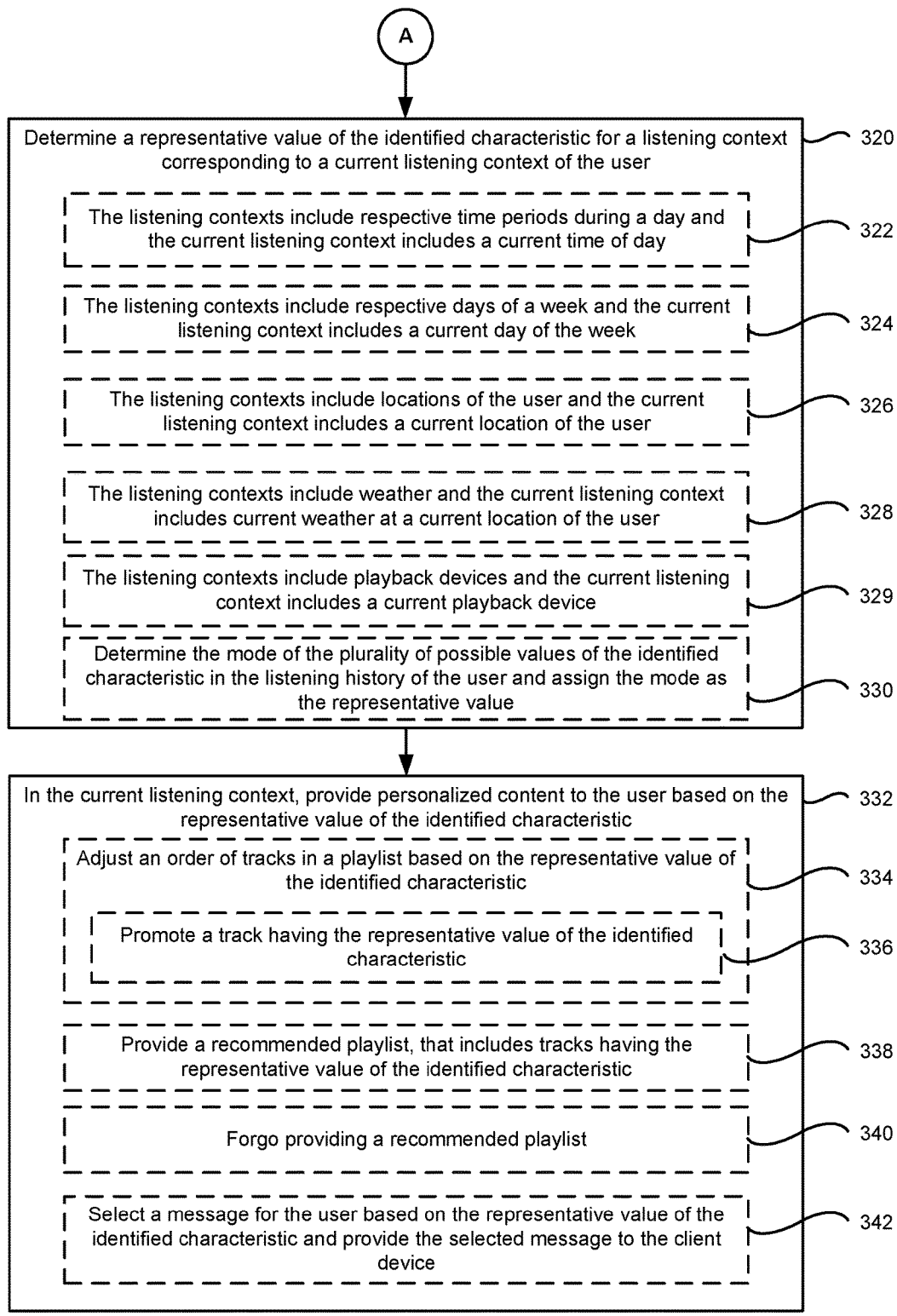

FIGS. 3A-3B are flow diagrams illustrating a method 300 for providing personalized content to a user, in accordance with some implementations. Method 300 may be performed (302) at an electronic device (e.g., media content server 104, FIGS. 1 and 5; client device 102, FIGS. 1 and 4) having one or more processors and memory storing instructions for execution by the one or more processors. The electronic device is associated with a media-providing service, (e.g., provides media content for playback to client devices 102 and/or media presentation systems 108 in a media content delivery system 100, or executes an application for the media-providing service). In some implementations, the method 300 is performed by executing instructions stored in the memory of a server system (e.g., in memory 506, FIG. 5) or client device (e.g., in memory 412, FIG. 4). In some implementations, the method 300 is performed by a combination of the server system and a client device. In supporting a media-providing service, the server system provides tracks (e.g., media items) for playback to client devices 102 and/or media presentation systems 108 of the media content delivery system 100. While the method 300 is described as being performed for tracks, it may be performed for other types of media items (e.g., video items).

Referring now to FIG. 3A, in performing the method 300, the electronic device accesses (304) a listening history of a user of the media-providing service. For each characteristic of a set of characteristics that describe tracks provided by the media-providing service, the electronic device determines (306) a measure of divergence with respect to listening contexts for the listening history of the user. Each characteristic has a plurality of possible values. The set of characteristics that describe the tracks may include (308) genre (e.g., the example in FIG. 2 of tables 200-a and 200-c) and/or mood of the track (e.g., as associated with the track at the server system of the media-providing service, for example in the metadata database 534, FIG. 5). The set of characteristics may also or alternatively include (310) one or more characteristics selected from the group consisting of a degree to which a track is acoustic, a strength of a beat, a degree to which a track sounds choppy (e.g., sonic density), suitability for dancing, positions of a track where downbeats occur, duration of a track, average dynamic range, a measure of energy of a track (e.g., intensity of the track), a degree to which the twelve pitches are balanced, a degree to which a track contains vocals (e.g., instrumentalness), key, a degree to which a live audience is present (e.g., audience presence), loudness (e.g., measured in decibels), a degree of consistency of timing (e.g., mechanism), fade-in point, fade-out point, modal scale (e.g., major scale or minor scale), suitability for running, a degree to which a track includes spoken words (e.g., an audio book), tempo, time signature (e.g., beats per measure), and a degree to which a track is cheerful (e.g., valence or positiveness of the track). In some embodiments, a characteristic may be a combination (e.g., weighted) of two or more of any of the above listed characteristics (e.g., attributes). For example, a characteristic may be a combination of the degree to which a track is acoustic times the inverse of the degree of consistency of timing.

In some embodiments, to determine the measure of divergence, the electronic device calculates (312) a Jensen-Shannon Divergence (e.g., using equation 2) for the characteristic with respect to the listening contexts. In some embodiments, the electronic device normalizes (314) the Jensen-Shannon Divergence for the characteristic relative to other users in the listening contexts (e.g., resulting in a Relative Adjusted Divergence (RAD) per equation 6).

The electronic device identifies (316) a characteristic, of the set of characteristics, that has a respective measure of divergence that satisfies a threshold indicative of a lack of uniformity in the listening history with respect to the listening contexts. In some embodiments, the electronic device identifies whether each characteristic satisfies the threshold. In some embodiments, the electronic device ranks (318) characteristics of the set of characteristics that have measures of divergence that satisfy the threshold by the measures of divergence and selects the characteristic with the greatest measure of divergence as the identified characteristic. Thus, the electronic device may identify the characteristic with the highest value of divergence. In some embodiments, multiple characteristics may be identified. In some embodiments, the respective divergences of the selected characteristics may be combined into a single metric (e.g., a weighted calculation of divergences of the characteristics). In some embodiments, the respective divergences remain as individual metrics (e.g., are not combined in a weighted calculation), and the steps of method 300 are performed with respect to each identified characteristic (e.g., selected characteristic).

Referring to FIG. 3B, the electronic device determines (320) a representative value of the identified characteristic for a listening context corresponding to a current listening context of the user. In some embodiments, this determination includes the electronic device performing a lookup function in a database (e.g., media account database 536) to match the current context to the listening history of the user in a corresponding context (e.g., previous equivalent context). For example, the electronic device may determine which of the plurality of possible values of the characteristic occurs in the listening history most often (i.e., the mode) for the listening context that corresponds to the current listening context.

In some embodiments, the listening contexts include (322) respective time periods during a day and the current listening context includes a current time of day. In some embodiments, the listening contexts include (324) respective days of a week and the current listening context includes a current day of the week. In some embodiments, the listening contexts include (326) locations of the user and the current listening context includes a current location of the user (e.g., current location of a client device 102 as determined by location-detection device 440, FIG. 4). In some embodiments, the listening contexts include (328) weather and the current listening context includes current weather at a current location of the user. For example, a weather application may provide current and/or historical weather data for a plurality of locations. The electronic device may reference this weather application to maintain the listening history of the user and to retrieve a current weather condition at the location of the user. In some embodiments, the listening contexts include (329) playback devices and the current listening context includes a current playback device. For example, one listening context could include playback through a speaker 108-1, a second listening context could include playback through a client device 102 (e.g., a mobile phone), and a third listening context could include playback through a stereo system in a vehicle.

In some embodiments, as mentioned, the electronic device determines (330) the mode (e.g., most occurring) of the plurality of possible values of the identified characteristic in the listening history of the user and assigns the mode as the representative value. For example, referring to table 200-a shown in FIG. 2, where the current listening context corresponds to a current time of day of 8 PM (e.g., within the 6 PM-12 AM listening context), the plurality of possible values for the characteristic (e.g., genre) include rock, rap, punk, and alternative. The electronic device may determine the mode of the plurality of possible values is rap, which occurs 8 times during the 6 PM-12 AM time period. The electronic device then assigns "rap" as the representative value for the user in the listening context of 6 PM-12 AM.

For the current listening context, the electronic device provides (332) personalized content to a user (e.g., to a client device 102 of the user) based on the representative value of the identified characteristic.

In some embodiments, the electronic device adjusts (334) an order of tracks in a playlist based on the representative value of the identified characteristic. For example, the electronic device promotes (336) a track (or multiple tracks) that has the representative value of the identified characteristics (e.g., promotes a track with a genre of "rap" to be higher in the play queue than a track with a genre that is not "rap"), thus moving the track to an earlier position in the playlist.

In some embodiments, the electronic device provides (338) a recommended playlist that includes tracks that have the representative value of the identified characteristic (e.g., creates or personalizes a playlist including tracks that have a genre of rap). For example, the playlist may include tracks that all have the representative value of the identified characteristic. The personalized playlist may include a combination of tracks that have the representative value and tracks that do not have the representative value, such that a number or percentage of tracks in the playlist have the representative value satisfies a threshold (e.g., are a majority). Alternatively, the playlist may include only tracks that have the representative value of the identified characteristic.

In some embodiments, the electronic device forgoes (340) providing a recommended playlist (e.g., the electronic device does not provide a recommended playlist). In some embodiments, forgoing to provide a recommended playlist comprises forgoing to provide a playlist in which a number of tracks having the representative value of the identified characteristic does not satisfy a threshold. For example, the electronic device may forgo providing a playlist that includes a combination of tracks where the number or percentage of tracks in the playlist having the representative value does not satisfy a threshold (e.g., the threshold is 75% "rap" songs, where the playlist only has 50% "rap" songs and thus is not provided to the user).

In some embodiments, the electronic device selects (342) a message for the user based on the representative value of the identified characteristic and provides the selected message to the user (e.g., the electronic device provides an advertisement during a particular context based on the identified characteristic to a client device 102). In some embodiments, the message is associated in the media-providing service with the representative value of the identified characteristic (e.g., the message is mapped to the representative value). For example, the message may be associated with tracks that are associated with the genre of rap. Thus, the message that is associated with rap may be provided to the user during the particular context (e.g., between 6 PM-12 AM).

Although FIGS. 3A-3B illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

Figure 4:
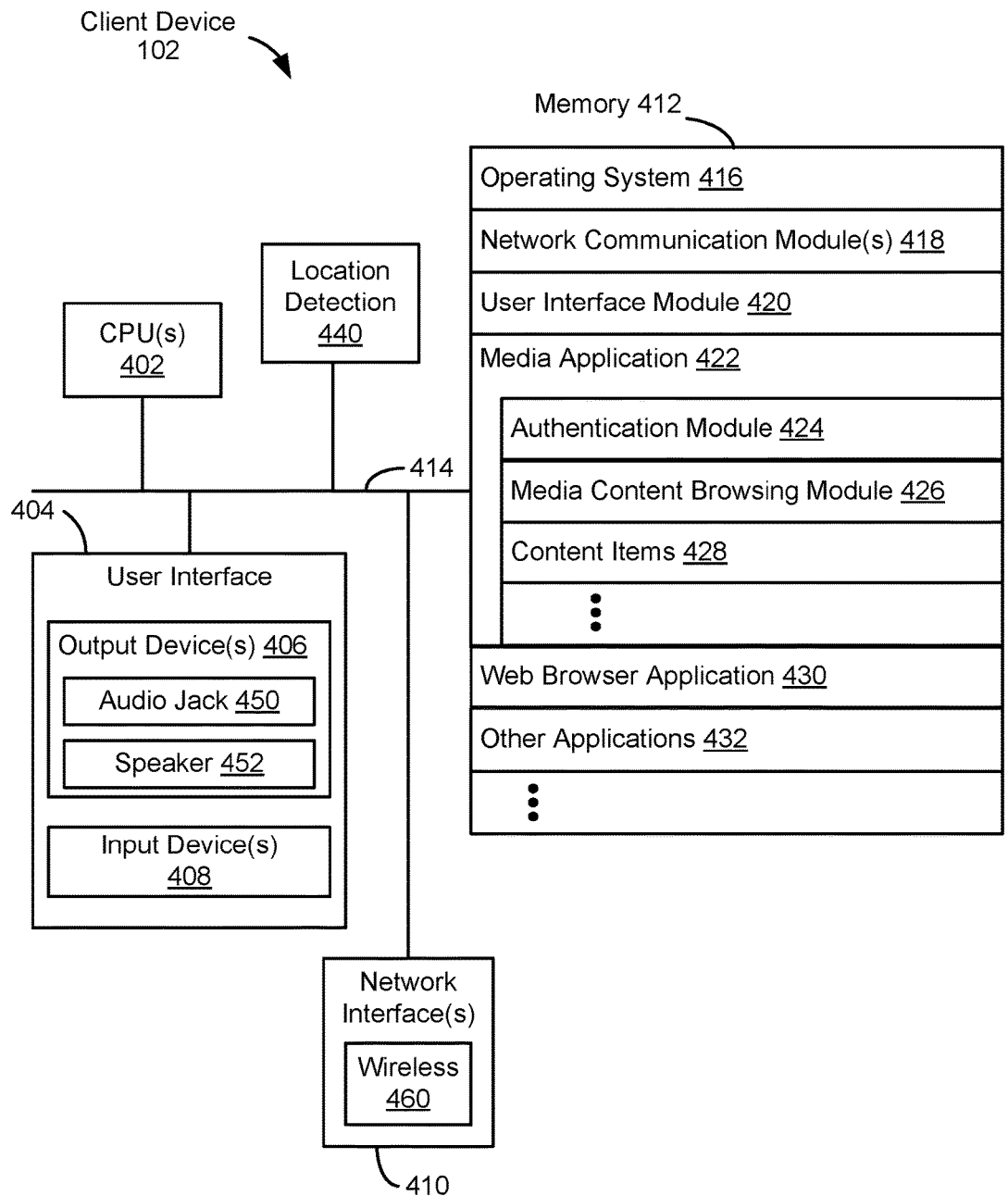
FIG. 4 is a block diagram illustrating a client device in accordance with some implementations.

FIG. 4 is a block diagram illustrating a client device 102 (e.g., client device 102-1 and/or client device 102-m, FIG. 1) in accordance with some implementations. The client device 102 includes one or more central processing units (CPU(s), i.e., processors or cores) 402, one or more network (or other communications) interfaces 410, memory 412, and one or more communication buses 414 for interconnecting these components. The communication buses 414 optionally include circuitry (sometimes called a chipset) that interconnects and controls communications between system components.

The client device 102 includes a user interface 404, including output device(s) 406 and input device(s) 408. In some implementations, the input devices 408 include a keyboard, mouse, or track pad. Alternatively, or in addition, in some implementations, the user interface 404 includes a display device that includes a touch-sensitive surface, in which case the display device is a touch-sensitive display. In client devices that have a touch-sensitive display, a physical keyboard is optional (e.g., a soft keyboard may be displayed when keyboard entry is needed). The output devices (e.g., output device(s) 406) include a speaker 452 (e.g., speakerphone device) and/or an audio jack 450 (or other physical output connection port) for connecting to speakers, earphones, headphones, or other external listening devices. Furthermore, some client devices 102 use a microphone and voice recognition device to supplement or replace the keyboard. Optionally, the client device 102 includes an audio input device (e.g., a microphone) to capture audio (e.g., speech from a user).

Optionally, the client device 102 includes a location-detection device 440, such as a global navigation satellite system (GNSS) (e.g., GPS (global positioning system), GLONASS, Galileo, BeiDou) or other geo-location receiver, and/or location-detection software for determining the location of the client device 102 (e.g., module for finding a position of the client device 102 using trilateration of measured signal strengths for nearby devices).

In some implementations, the one or more network interfaces 410 include wireless and/or wired interfaces for receiving data from and/or transmitting data to other client devices 102, media presentations systems 108, a media content server 104, and/or other devices or systems. In some implementations, data communications are carried out using any of a variety of custom or standard wireless protocols (e.g., NFC, RFID, IEEE 802.15.4, Wi-Fi, ZigBee, 6LoW-PAN, Thread, Z-Wave, Bluetooth, ISA100.11a, WirelessHART, MiWi, etc.). Furthermore, in some implementations, data communications are carried out using any of a variety of custom or standard wired protocols (e.g., USB, Firewire, Ethernet, etc.). For example, the one or more network interfaces 410 include a wireless interface 460 for enabling wireless data communications with other client devices 102, media presentations systems 108, and/or or other wireless (e.g., Bluetooth-compatible) devices (e.g., for streaming audio data to the media presentations system 108 of an automobile). Furthermore, in some implementations, the wireless interface 460 (or a different communications interface of the one or more network interfaces 410) enables data communications with other WLAN-compatible devices (e.g., a media presentations system 108) and/or the media content server 104 (via the one or more network(s) 112, FIG. 1).

In some implementations, client device 102 includes one or more sensors including, but not limited to, accelerometers, gyroscopes, compasses, magnetometer, light sensors, near field communication transceivers, barometers, humidity sensors, temperature sensors, proximity sensors, range finders, and/or other sensors/devices for sensing and measuring various environmental conditions.

Memory 412 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 412 may optionally include one or more storage devices remotely located from the CPU(s) 402. Memory 412, or alternately, the non-volatile memory solid-state storage devices within memory 412, includes a non-transitory computer-readable storage medium. In some implementations, memory 412 or the non-transitory computer-readable storage medium of memory 412 stores the following programs, modules, and data structures, or a subset or superset thereof:

- an operating system 416 that includes procedures for handling various basic system services and for performing hardware-dependent tasks;
- network communication module(s) 418 for connecting the client device 102 to other computing devices (e.g., media presentation systems 108, media content server 104, and/or other client devices) via the one or more network interface(s) 410 (wired or wireless) connected to one or more network(s) 112;
- a user interface module 420 that receives commands and/or inputs from a user via the user interface 404 (e.g., from the input devices 408) and provides outputs for playback and/or display on the user interface 404 (e.g., the output devices 406);

a media application 422 (e.g., an application associated with and for accessing a content (i.e., media-providing) service provided by a media content provider such as media content server 104, including a media player, a streaming media application, or any other appropriate application or component of an application) for browsing, receiving, processing, presenting, and requesting playback of media (e.g., media items). The media application 422 is also used to monitor, store, and/or transmit (e.g., to media content server 104) data associated with user behavior. The media application 422 may include a content-personalization module (e.g., analogous to the content personalization module 524, FIG. 5) and also includes the following modules (or sets of instructions), or a subset or superset thereof:

an authentication module 424 for sending authentication tokens corresponding to one or more media presentation systems associated with the client device 102 (e.g., one or more of the media presentation systems 108 from FIG. 1), receiving authentication tokens from other devices, and/or generating authentication tokens for media presentation systems associated with client device 102;

a media content browsing module 426 for providing controls and/or user interfaces enabling a user to navigate, select for playback, and otherwise control or interact with media content, whether the media content is stored or played locally or remotely;

a content items module 428 storing media items for playback;

a web browser application 430 (e.g., Internet Explorer or Edge by Microsoft, Firefox by Mozilla, Safari by Apple, or Chrome by Google) for accessing, viewing, and interacting with web sites; and other applications 432, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

In some implementations, the media presentation system 108 is a type of client device 102, and includes some or all of the same components, modules, and sub-modules as described above in FIG. 4 with respect to the client device 102.

Figure 5:
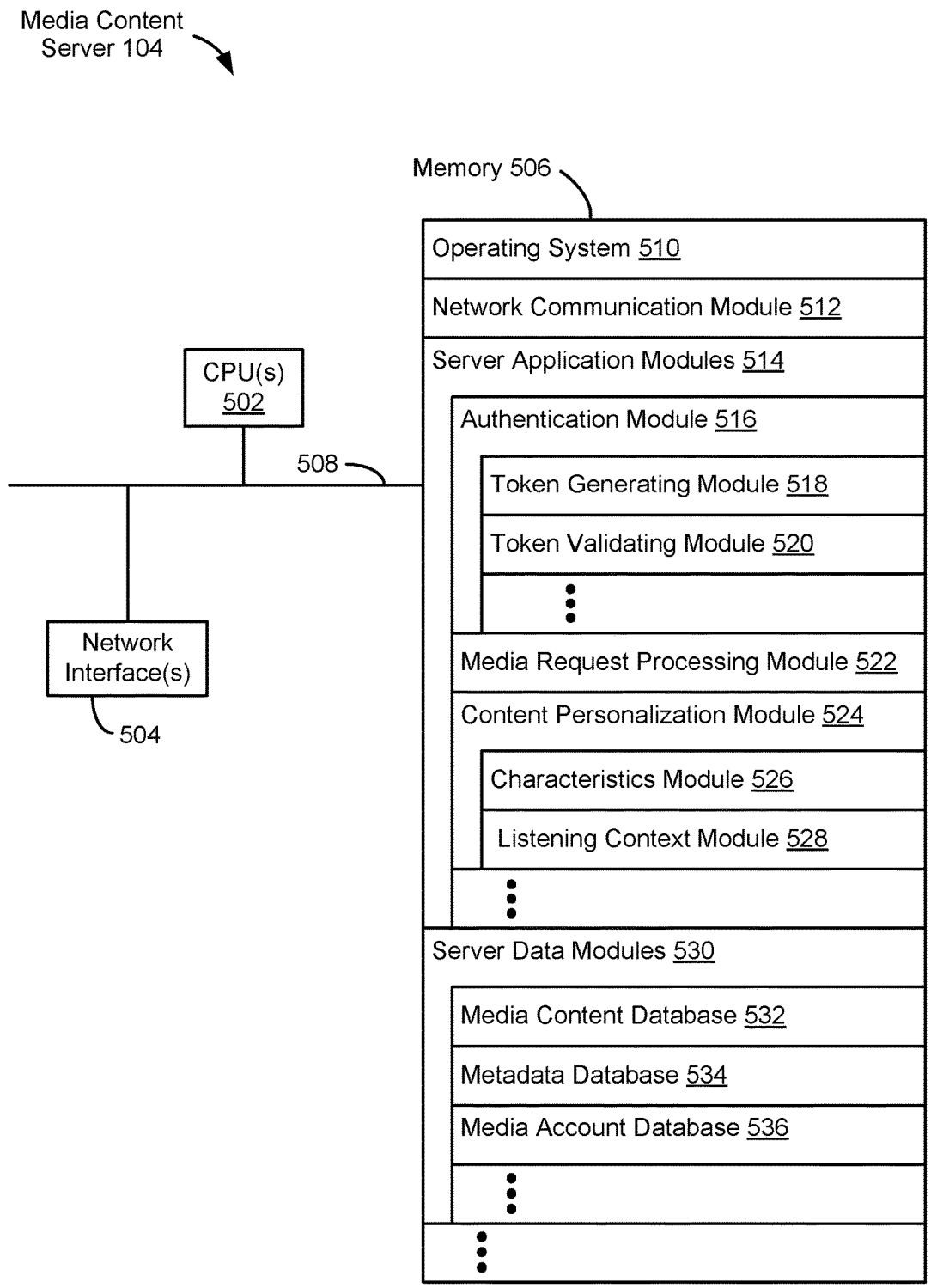
FIG. 5 is a block diagram illustrating a media content server in accordance with some implementations.

FIG. 5 is a block diagram illustrating a media content server 104 in accordance with some implementations. The media content server 104 typically includes one or more central processing units/cores (CPUs) 502, one or more network interfaces 504, memory 506, and one or more communication buses 508 for interconnecting these components.

Memory 506 includes high-speed random access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 506, optionally, includes one or more storage devices remotely located from one or more CPUs 502. Memory 506, or, alternatively, the non-volatile solid-state memory device(s) within memory 506, includes a non-transitory computer-readable storage medium. In some implementations, memory 506, or the non-transitory computer-readable storage medium of memory 506, stores the following programs, modules and data structures, or a subset or superset thereof:

an operating system 510 that includes procedures for handling various basic system services and for performing hardware-dependent tasks;

a network communication module 512 that is used for connecting the media content server 104 to other computing devices via one or more network interfaces 504 (wired or wireless) connected to one or more networks 112;

one or more server application modules 514 for performing various functions with respect to providing and managing a content service, the server application modules 514 including, but not limited to, one or more of:

an authentication module 516 for managing authentication and/or authorization requests, the authentication module 516 including, but not limited to, one or more of:

a token generating module 518 for generating authentication tokens permitting use of media presentation systems 108; and a token validating module 520 for verifying that an authentication token is valid (e.g., has not yet expired or has not yet been revoked); and a media request processing module 522 for processing requests for media content and facilitating access to requested media items by client devices (e.g., the client device 102) including, optionally, streaming media content to such devices and/or to one or more media presentation systems 108;

a content personalization module 524 for providing personalized content (e.g., playlists, tracks, advertisements, tooltips, notifications, etc.) to users of the content service, including, but not limited to, one or more of:

a characteristics module 526 for processing and storing data relating to characteristics that describe tracks (e.g., sorting data based on characteristics and/or identifying different characteristics); and a listening-context module 528 for processing (e.g., identifying and/or receiving data from a device of the user) listening contexts;

one or more server data module(s) 530 for handling the storage of and access to media items and metadata relating to the media items; in some implementations, the one or more server data module(s) 530 include:

a media content database 532 for storing media items (e.g., audio files, video files, text files, etc.);

a metadata database 534 for storing metadata relating to the media items; and a media account database 536 for storing account information for user media accounts, including user profiles, credentials (e.g., user identifiers, passwords, email addresses, etc.), credentials or identifiers of any linked accounts, and the like.

In some implementations, the media content server 104 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Each of the above identified modules stored in memory 412 and 506 corresponds to a set of instructions for performing a function described herein. The above identified modules or programs (i.e., sets of instructions) need not be implemented as separate software programs, procedures, or modules, and thus various subsets of these modules may be combined or otherwise re-arranged in various implementations. In some implementations, memory 412 and 506 optionally store a subset or superset of the respective modules and data structures identified above. Furthermore, memory 412 and 506 optionally store additional modules and data structures not described above.

Although FIG. 5 illustrates the media content server 104 in accordance with some implementations, FIG. 5 is intended more as a functional description of the various features that may be present in one or more media content servers than as a structural schematic of the implementations described herein. In practice, and as recognized by those of ordinary skill in the art, items shown separately could be combined and some items could be separated. For example, some items shown separately in FIG. 5 could be implemented on single servers and single items could be implemented by one or more servers. The actual number of servers used to implement the media content server 104, and how features are allocated among them, will vary from one implementation to another and, optionally, depends in part on the amount of data traffic that the server system handles during peak usage periods as well as during average usage periods.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A method, comprising
at an electronic device associated with a media-providing service and having one or more processors and memory storing instructions for execution by the one or more processors:
   accessing a listening history of a user of the media-providing service;
   for each characteristic of a set of characteristics describing tracks provided by the media-providing service, determining, for the user, a measure of divergence indicating a degree of lack of uniformity in the listening history of the user with respect to listening contexts, the determining including normalizing, based on the listening history, a calculated divergence for the characteristic relative to measures of divergence of other users in the listening contexts, wherein each characteristic has a plurality of possible values;
   identifying a characteristic, of the set of characteristics, having a respective measure of divergence that satisfies a threshold indicative of the lack of uniformity in the listening history with respect to the listening contexts;
   determining a representative value of the identified characteristic for a listening context corresponding to a current listening context of the user;
   in the current listening context, providing personalized content to a client device of the user based on the representative value of the identified characteristic, including adjusting an order of tracks within a playlist to promote a track within the playlist, the track having the representative value of the identified characteristic for the listening context corresponding to the current listening context and
   streaming one or more tracks within the playlist to the client device of the user in accordance with the adjusted order.

2. The method of claim 1, wherein the set of characteristics includes genre and mood.

3. The method of claim 1, wherein the set of characteristics includes one or more characteristics selected from the group consisting of a degree to which a track is acoustic, a strength of a beat, a degree to which a track sounds choppy, suitability for dancing, positions of a track where downbeats occur, duration of a track, average dynamic range, a measure of energy of a track, a degree to which the twelve pitches are balanced, a degree to which a track contains vocals, key, a degree to which a live audience is present, loudness, a degree of consistency of timing, fade-in point, fade-out point, modal scale, suitability for running, a degree to which a track includes spoken words, tempo, time signature, and a degree to which a track is cheerful.

4. The method of claim 1, wherein:
the listening contexts include respective time periods during a day; and
the current listening context includes a current time of day.

5. The method of claim 1, wherein:
the listening contexts include respective days of a week; and
the current listening context includes a current day of the week.

6. The method of claim 1, wherein:
the listening contexts include locations of the user; and
the current listening context includes a current location of the user.

7. The method of claim 1, wherein:
the listening contexts include weather; and
the current listening context includes current weather at a current location of the user.

8. The method of claim 1, wherein:
the listening contexts include playback devices; and
the current listening context includes a current playback device.

9. The method of claim 1, wherein providing the personalized content comprises forgoing to provide a recommended playlist.

10. The method of claim 9, wherein forgoing to provide a recommended playlist comprises forgoing to provide a playlist in which a number of tracks having the representative value of the identified characteristic does not satisfy a threshold.

11. The method of claim 1, wherein providing the personalized content comprises:
selecting a message for the user based on the representative value of the identified characteristic; and
providing the selected message to the client device of the user.

12. The method of claim 11, wherein the message is associated in the media-providing service with the representative value of the identified characteristic.

13. The method of claim 1, wherein the calculated divergence comprises a Jensen-Shannon Divergence for the characteristic with respect to the listening contexts.

14. The method of claim 1, wherein identifying the characteristic comprises:
ranking characteristics of the set of characteristics that have measures of divergence that satisfy the threshold by the measures of divergence; and
selecting the characteristic with the greatest measure of divergence as the identified characteristic.

15. The method of claim 1, wherein determining the representative value of the identified characteristic for the listening context corresponding to the current listening context of the user comprises:
determining, for the listening context corresponding to the current listening context of the user, the mode of the plurality of possible values of the identified characteristic in the listening history of the user; and
assigning the mode as the representative value.

16. An electronic device, comprising:
one or more processors; and
memory storing one or more programs for execution by the one or more processors, the one or more programs including instructions for:
accessing a listening history of a user of the media-providing service;
for each characteristic of a set of characteristics describing tracks provided by the media-providing service, determining, for the user, a measure of divergence indicating a degree of lack of uniformity in the listening history of the user with respect to listening contexts, the determining including normalizing, based on the listening history, a calculated divergence for the characteristic relative to measures of divergence of other users in the listening contexts, wherein each characteristic has a plurality of possible values;
identifying a characteristic, of the set of characteristics, having a respective measure of divergence that satisfies a threshold indicative of the lack of uniformity in the listening history with respect to the listening contexts;
determining a representative value of the identified characteristic for a listening context corresponding to a current listening context of the user;
in the current listening context, providing personalized content to a client device of the user based on the representative value of the identified characteristic, including adjusting an order of tracks within a playlist to promote a track within the playlist, the track having the representative value of the identified characteristic for the listening context corresponding to the current listening context and
streaming one or more tracks within the playlist to the client device of the user in accordance with the adjusted order.

17. A non-transitory computer-readable storage medium, storing one or more programs for execution by one or more processors of an electronic device, the one or more programs including instructions for:
accessing a listening history of a user of the media-providing service;
for each characteristic of a set of characteristics describing tracks provided by the media-providing service, determining, for the user, a measure of divergence indicating a degree of lack of uniformity in the listening history of the user with respect to listening contexts, the determining including normalizing, based on the listening history, a calculated divergence for the characteristic relative to measures of divergence of other users in the listening contexts, wherein each characteristic has a plurality of possible values;
identifying a characteristic, of the set of characteristics, having a respective measure of divergence that satisfies a threshold indicative of the lack of uniformity in the listening history with respect to the listening contexts;
determining a representative value of the identified characteristic for a listening context corresponding to a current listening context of the user;
in the current listening context, providing personalized content to a client device of the user based on the representative value of the identified characteristic, including adjusting an order of tracks within a playlist to promote a track within the playlist, the track having the representative value of the identified characteristic for the listening context corresponding to the current listening context and
streaming one or more tracks within the playlist to the client device of the user in accordance with the adjusted order.

18. The method of claim 1, wherein normalizing, based on the listening history, the calculated divergence for the characteristic relative to measures of divergence of other users in the listening contexts is performed in accordance with a determination that the user has listened to tracks provided by the media-providing service for a threshold amount during a preceding time window.

* * * * *